(12) United States Patent
Waybrant

(10) Patent No.: US 8,350,189 B1
(45) Date of Patent: Jan. 8, 2013

(54) METHOD OF MAKING A METAL ART OBJECT

(76) Inventor: Miles E Waybrant, Flint, MI (US)

( * ) Notice: Subject to any disclaimer, the term of this patent is extended or adjusted under 35 U.S.C. 154(b) by 1119 days.

(21) Appl. No.: 12/253,118

(22) Filed: Oct. 16, 2008

(51) Int. Cl.
*B23K 9/12* (2006.01)

(52) U.S. Cl. ............... 219/137 PS; 219/73.21; 219/76.1

(58) Field of Classification Search ............. 219/137 R, 219/137 PS, 137 WM, 137.2, 74, 76.1, 73.21; 248/125.1; 273/280
See application file for complete search history.

(56) References Cited

U.S. PATENT DOCUMENTS

| | | | | |
|---|---|---|---|---|
| 1,128,175 A * | 2/1915 | Morf | | 427/449 |
| 1,755,038 A * | 4/1930 | Tition | | 76/107.1 |
| 2,473,601 A * | 6/1949 | Lobosco | | 219/74 |
| 3,323,491 A * | 6/1967 | Granick | | 118/506 |
| 3,457,625 A * | 7/1969 | Wanamaker | | 29/407.1 |
| 3,854,195 A * | 12/1974 | Landig | | 428/596 |
| 4,512,513 A * | 4/1985 | Rogers | | 239/8 |
| 5,460,851 A * | 10/1995 | Jenkins | | 427/199 |
| 5,906,284 A * | 5/1999 | Hammerstrom et al. | | 211/205 |
| 6,572,379 B1 | 6/2003 | Sears et al. | | |
| 2005/0040143 A1 * | 2/2005 | Neff et al. | | 219/74 |
| 2007/0284350 A1 * | 12/2007 | Graham et al. | | 219/137 R |

* cited by examiner

*Primary Examiner* — Henry Yuen
*Assistant Examiner* — John Wasaff

(57) ABSTRACT

A method of making a metal art object using a MIG welder to form small and large end puddles having a primarily gold or blue sheen or a center gold dot formed by using combinations of a strip of selected metal and a wire of a selected metal; selectively tilting a surface to form end puddles having a feathered perimeter; randomly obtaining a hole in the end puddle; and affixing at least one, either randomly or non-randomly selected, end puddle to a user-selected media by welding, gluing, or wiring. The blue sheen is obtained by using a strip of stainless steel and a wire of stainless steel. The gold sheen is formed by using a strip of stainless steel and a wire of steel. The center gold dot primary is formed using the first metal of galvanized steel for the strip and the second metal of steel for the wire.

10 Claims, 2 Drawing Sheets

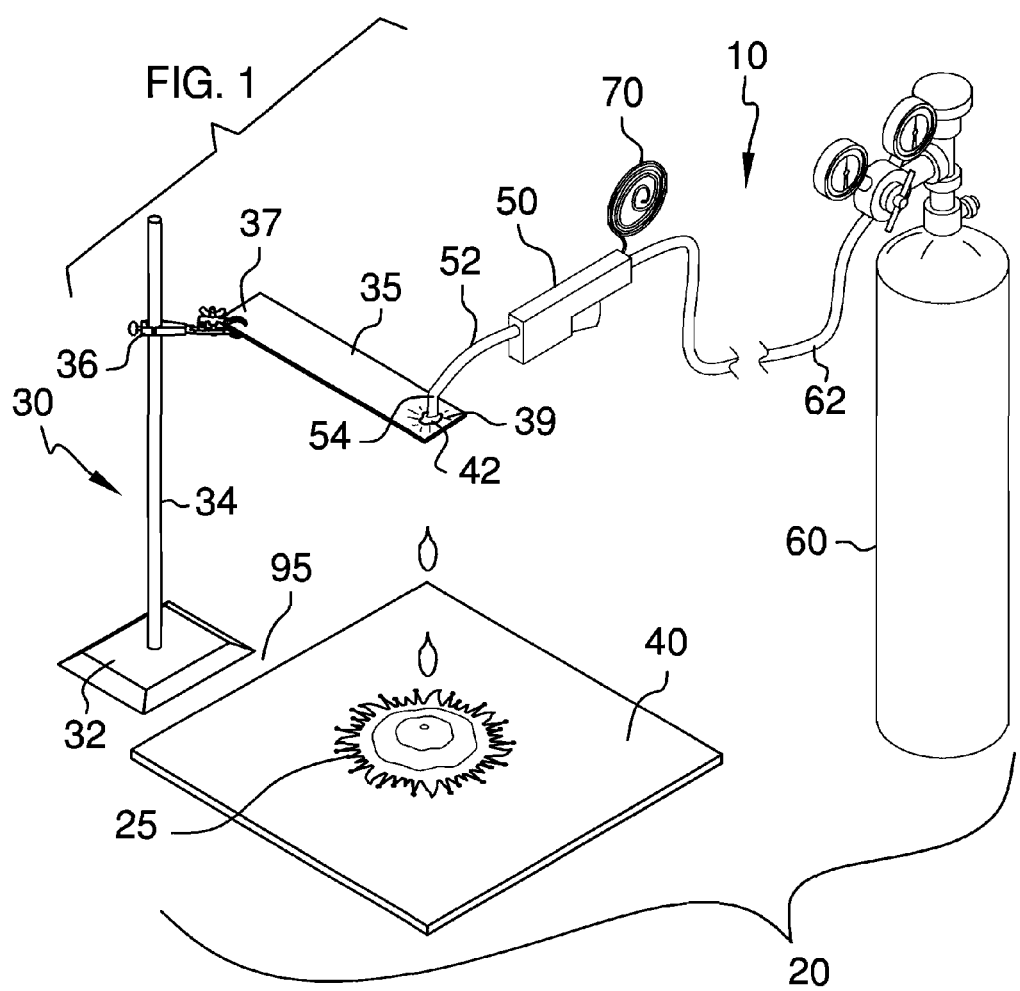
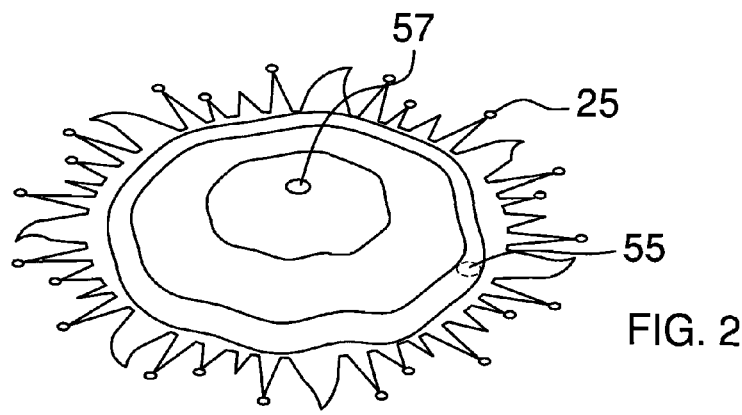

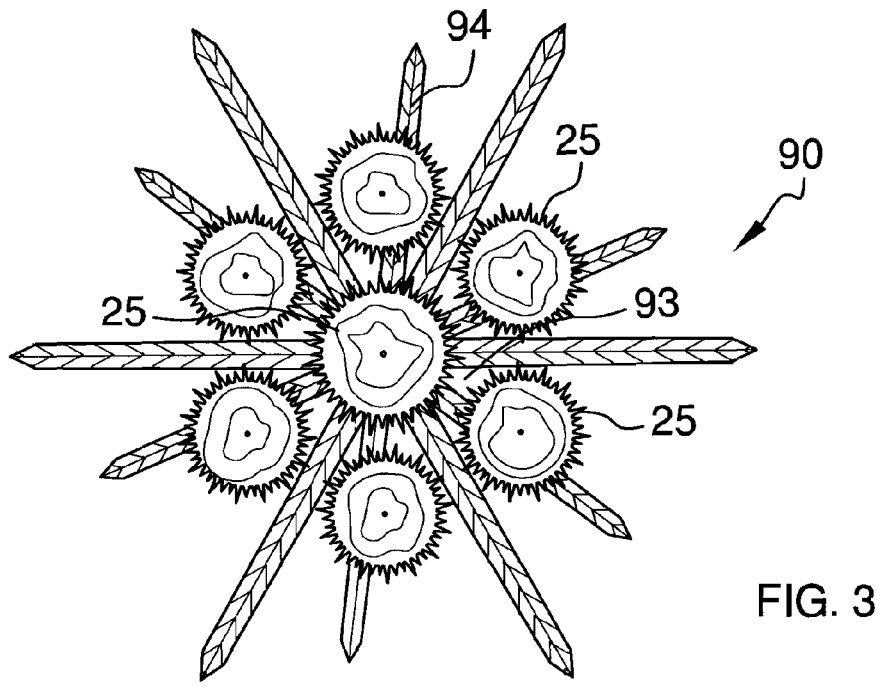
FIG. 3
FIG. 4
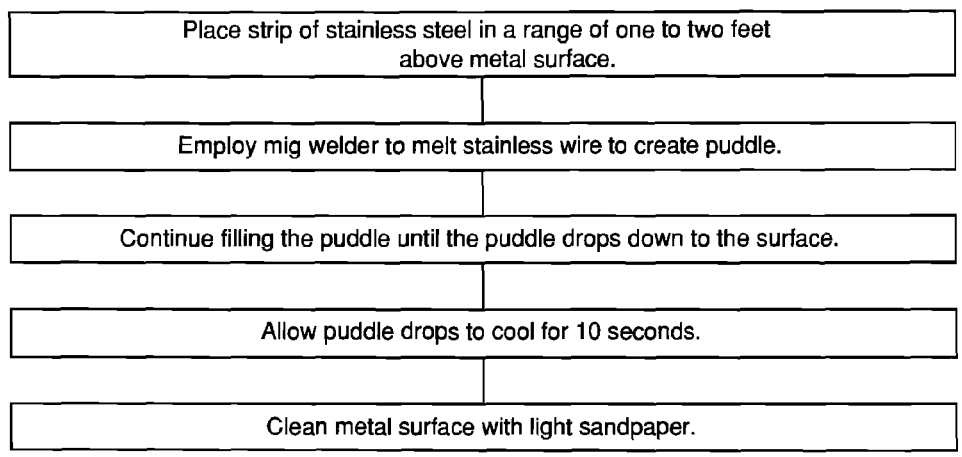

METHOD OF MAKING A METAL ART OBJECT

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

FIELD OF THE INVENTION

The present invention relates generally to the field of providing metal art objects through the art of welding and, in particular, to a method of making a metal art object.

BACKGROUND OF THE INVENTION

In the field of welding, various techniques are typically employed to form a desired metal object. In addition to welding techniques, various sculpting methods have been proposed in the past, including means for sculpting in metal. Forming a hollow metallic sculpture has been accomplished by creating a destructible core which is surrounded by metallic material following the lines or contours of the core, and thereafter melting, burning or otherwise destroying the core to leave only the remaining hollow metallic sculpture. Another method of forming a metallic sculpture is to first sculpt a core from meltable or otherwise destroyable material in a desired artistically pleasing shape, and then to apply pin-like elements, including nails, to the surface of the core, having large flattened heads flush with the core surface and at some locations, with one another. Thereafter, a brazing rod is applied to the heads of the nails, using conventional welding methods, forming a metallic sheath the conforms to the surface of the sculpted core and which is formed throughout with irregularly shaped opening occurring between the heads of the pin elements. The core is then burned out or otherwise destroyed without affecting the metallic sheath, leaving the hollow metallic sheath as the end sculpture. However, the present method of making a metal art object is a novel method utilizing a base having a height-adjustable clamp which suspends a selected strip of metal, either stainless steel or galvanized steel, over a smooth metal platform and a MIG welder utilizing 140 amps and 110 volts. A wire is fed through the MIG welder tip. The wire is 0.030 inches in diameter. The combination of a stainless steel strip and a stainless steel wire results in a primarily gold sheen of an end puddle, while the combination of a stainless steel strip and a steel wire results in a primarily blue sheen. The combination of a galvanized steel strip and a steel wire results in a center gold dot in the end puddle. The user steadily holds the tip at a 90-degree angle over the distal end of the steel strip, which is farthest away from the base, to melt the distal end, forming a weld puddle. The weld puddle becomes heavy as the strip is heated and drops, thus the distal end drips and falls onto a platform to form an end puddle. A plurality of end puddles may be formed using the foregoing method and each puddle is unique. The size of each puddles varies according to the amount of the strip melted and the height to which the clamp is adjusted. The melting of a larger amount of steel strip results in a larger puddle and a higher clamp adjustment results in a larger puddle.

The platform must be maintained in a smooth and clean condition. A radius grinder may be used to keep the platform completely smooth. Light sandpaper may be used to keep the platform clean. The platform may be tilted to form a feathered perimeter on the end puddle. After several of the puddles have been formed, a user may use the puddles, welding them or otherwise connecting them together to form a plethora of metallic art objects, including wall hangings, flower arrangements, candelabras, sculptures and the like. The puddles may be used randomly to create free-form art objects. Further, the puddles may also be selected for similar qualities to form recognizable objects. For instance, puddles which have vertical lines and feathered edges may be used to form a peacock metallic sculpture. Wire or other sculptured pieces may be used to connect the puddles to form the various sculptures. Another example of use is in a flower arrangement wherein the puddles are used to represent a blossom and metal wire is used to represented stems.

SUMMARY OF THE INVENTION

The present method of making a metal art object utilizes a MIG welder to form small and large end puddles having a primarily gold or blue sheen or a center gold dot formed by using combinations of a strip of selected metal and a wire of a selected metal; selectively tilting a surface to form end puddles having a feathered perimeter; randomly obtaining a hole in the end puddle; and affixing at least one, either randomly or non-randomly selected, end puddle to a user-selected media by welding, gluing, or wiring. The blue sheen is obtained by using a combination of a strip of stainless steel and a wire of stainless steel. The gold sheen is formed by using a combination a strip of stainless steel and a wire of steel. The center gold dot primary is formed using a combination of the first metal of galvanized steel for the strip and the second metal of steel for the wire. The MIG welder is part of a welding assembly provides a mounting assembly, a metallic strip of a selected first metal, a platform, a MIG welder, and a gas tank. The mounting assembly provides a base which sits flat atop a working surface; a dowel vertically extending from the base; and an adjustable clamp vertically engaging the dowel. The metallic strip has a proximal end and a distal end. The distal end is removably affixed to the clamp in parallel position to the base. The first metal is selected from either stainless steel or galvanized steel. The platform is formed of smooth metal and is positioned below the strip. The platform is in a range of one-fourth to one-half inch thick. The MIG welder has a liner and a contact tip. A spool of wire of a selected second metal is fed through the liner and then through the contact tip to form a portion of the weld puddle. The wire has the diameter of 0.030 inches. The second metal is selected from either stainless steel wire or steel wire. The gas tank contains a gas mixture of argon, carbon dioxide, and helium. The gas tank is connected to the MIG welder via tubing to provide the source of gas by which MIG welder melts the distal end of the strip to form a weld puddle. The MIG welder utilizes 140 amps and 110 volts.

Next, the user adjusts the clamp to a selected height of either about one foot to form a small size end puddle or about two feet to form large size end puddle. An amount of strip to form an end puddle must also be selected whereby an end puddle having a size selected from the group consisting of large and small is formed. In addition, the user must select the desired first metal and second metal to form an end puddle having a desired primary characteristic. An end puddle may have the primary characteristic of a blue sheen, a gold sheen, or a center gold dot. To form an end puddle having the blue sheen primary characteristic, the first metal of stainless steel is used for the strip and the second metal of stainless steel is used for the wire. To form an end puddle having the gold sheen primary characteristic, the first metal of stainless steel is used for the strip and the second metal of steel is used for the wire. To form an end puddle having the center gold dot primary characteristic, the first metal of galvanized steel is used for the strip and the second metal of steel is used for the wire. Further, the user may tilt the platform to form an end puddle having a secondary characteristic of a feathered perimeter.

The user feeds the wire through the liner of the MIG welder and then through the contact tip when using the MIG welder to form a weld puddle. As the MIG welder is used, the user forms a weld puddle and continues to selectively fill the weld puddle with the selected amount of melted strip whereby the larger amount of the strip used to fill the weld puddle results in a large end puddle, while a smaller amount of the strip used to fill the weld puddle results in a small end puddle. Thus, both the height of the clamp holding the strip and the amount of strip used controls whether an end puddle is large or small. The user then allows the weld puddle to drop onto the platform thereby forming the end puddle. A hole may be randomly formed in a random position in the end puddle. The hole formation depends on how hard the weld puddle drops onto the platform. The user must wait a period of time of about ten seconds to allow the end puddle to cool before picking up the end puddle with a handling tool. The user may use a radius grinder for maintaining platform smoothness. The user also cleans the platform with light sandpaper. Using the present method the user forms at least one end puddle, but may form a plurality of end puddles.

The user forms an art object by selecting at least one end puddle via a first process, the first process selected from the group consisting of the step of randomly selecting each end puddle and the step of non-randomly selecting each end puddle according to size, a primary characteristic, and a secondary characteristic. After at least one end puddle is cooled, the user selects the end puddle having the selected size, primary characteristic, and secondary characteristic and affixes each end puddle to a user-selected media. Each end puddle is affixed to the selected media, by a second process selected from the group consisting of the step of welding each end puddle to the selected media; the step of gluing each end puddle to the selected media; and the step of wiring each end puddle to the selected media. Art objects are provided in various forms for various applications. Examples of art objects which are formed utilizing the present method are wall hangings, flower arrangements, candelabras, free-form art objects, non-abstract art objects. An example of the non-random selection of end puddles is the use of a plurality of small end puddles having the blue sheen blue characteristic and feathered perimeter secondary characteristic affixed to a metal media to form the feathers of a peacock sculpture, the end puddles glued onto vertically positioned copper wiring which simulate the appearance of feather shafts.

As such, the general purpose of the improved method of making a metal art object which has all of the advantages of the prior art mentioned heretofore and many novel features that result in an improved method of making a metal art object which is not anticipated, rendered obvious, suggested, or even implied by the prior art, either alone or in combination thereof.

An object of the present method of making a metal art object is to form a metallic art object.

Another object of the present method of making a metal art object is to form a novel metallic art object using a novel method.

Yet another object of the present method of making a metal art object is to use a MIG welder to form a novel metallic art object by a novel method utilizing a combination of a strip of stainless steel material and a stainless steel wire for welding thereby dripping a weld puddle onto a platform thus forming an end puddle having a gold sheen as a primary characteristic.

Still another object of the present method is to use a MIG welder to form a novel metallic art object by a novel method utilizing a combination of a strip of stainless steel material and a steel wire for welding thereby dripping a weld puddle onto a platform thus forming an end puddle having a blue sheen as a primary characteristic.

Even still another object of the present method is to use a MIG welder to form a novel metallic art object by a novel method utilizing a combination of a strip of galvanized steel material and a steel wire for welding thereby dripping a weld puddle onto a platform thus forming an end puddle having a center gold dot as a primary characteristic.

Still yet another object of the present method is to use a MIG welder and a platform which is selectively tilted to form a weld puddle onto the platform whereby a end puddle having a feathered perimeter as a primary characteristic is formed.

It is even still further an object of the present method to selectively form large and small end puddles by raising and lowering, respectively, the clamp by which a strip of material is suspended and by using more or less strip material to form large and small end puddles, respectively.

It is still yet further an object of the present method to form at least one end puddle and affixing each end puddle to a media to form a metallic art object.

Thus has been broadly outlined the more important features of the improved method of making a metal art object so that the detailed description thereof that follows may be better understood and in order that the present contribution to the art may be better appreciated.

These together with additional objects, features and advantages of the improved method of making a metal art object will be readily apparent to those of ordinary skill in the art upon reading the following detailed description of presently preferred, but nonetheless illustrative, embodiments of the improved method of making a metal art object when taken in conjunction with the accompanying drawings. In this respect, before explaining the current embodiments of the novel method of making a metal art object in detail, it is to be understood that the invention is not limited in its application to the details of construction and arrangements of the components set forth in the following description or illustration. The invention is capable of other examples and of being practiced and carried out in various ways. It is also to be understood that the phraseology and terminology employed herein are for purposes of description and should not be regarded as limiting.

Those skilled in the art will appreciate that the concept of this disclosure may be readily utilized as a basis for the design of other structures, methods, and kits for carrying out the several purposes of the improved method of making a metal art object. It is therefore important that the claims be regarded as including such equivalent constructions insofar as they do not depart from the spirit and scope of the present invention.

Objects of the present method of making a metal art object, along with various novel features that characterize the invention are particularly pointed out in the claims forming a part of this disclosure. For better understanding of the novel method of making a metal art object, its operating advantages and specific objects attained by its uses, refer to the accompanying drawings and description.

BRIEF DESCRIPTION OF THE DRAWINGS

FIG. 1 is a perspective view of the components used to make a metal object according to the present method.

FIG. 2 is a perspective view of an exemplary end puddle having a primary characteristic of a center old dot and a secondary characteristic of a feathered perimeter with an alternative position for a hole shown in broken lines.

FIG. 3 is a top plan view of an exemplary art object utilizing a plurality of end puddles.

FIG. 4 is a block diagram of the present method.

DETAILED DESCRIPTION OF THE DRAWINGS

With reference now to the drawings, and in particular FIGS. 1 through 4 thereof, examples of the employing the principles and concepts of the present method of making a metal art object, generally designated by the reference number 10, will be described.

Referring to FIGS. 1 through 4, the present method of making a metal art object is illustrated. The present method of making a metal art object 10 utilizes a welding assembly 20 to form at least one end puddle 25, each puddle of which is used to form a metal art object 90. The welding assembly 20 provides a mounting assembly 30, a metallic strip 35 of a selected first metal, a platform 40, a MIG welder 50, and a gas tank 60. The mounting assembly 30 provides a base 32 which sits flat atop a working surface 95; a dowel 34 vertically extending from the base 32; and a vertically adjustable clamp 36 engaging the dowel 34. The metallic strip 35 has a proximal end 37 and a distal end 39. The proximal end 37 is removably affixed to the clamp 36 in parallel position to the base 32. The first metal is selected from either stainless steel or galvanized steel. The platform 40 is formed of smooth metal and is positioned below the strip 35 in order to catch a weld puddle 42 as it drips from the distal end 39 of the strip 35. The platform 40 is in a range of one-fourth to one-half inch thick. The MIG welder 50 has a liner 52 therethrough and a contact tip 54. A spool of wire 70 of a selected second metal is fed through the liner 52 and then through the contact tip 54 to form a portion of the weld puddle 42. The wire 70 has the diameter of 0.030 inches. The second metal is selected from either stainless steel wire or steel wire. The gas tank 60 contains a gas mixture of argon, carbon dioxide, and helium. The gas tank 60 is connected to the MIG welder 50 via tubing 62 to provide the source of gas by which MIG welder 50 melts the distal end 39 of the strip 35 to form a weld puddle 42. The MIG welder 50 utilizes 140 amps and 110 volts.

Next, the user adjusts the clamp 36 to a selected height of either about one foot to form a small size end puddle 25 or about two feet to form large size end puddle 25. An amount of strip 35 to form an end puddle 25 must also be selected whereby an end puddle 25 having a size selected from the group consisting of large and small is formed. In addition, the user must select the desired first metal and second metal to form an end puddle 25 having a desired primary characteristic. An end puddle 25 may have the primary characteristic of a blue sheen, a gold sheen, or a center gold dot 57, as shown in FIG. 2. To form an end puddle 25 having the blue sheen primary characteristic, the first metal of stainless steel is used for the strip 35 and the second metal of stainless steel is used for the wire 70. To form an end puddle 25 having the gold sheen primary characteristic, the first metal of stainless steel is used for the strip 35 and the second metal of steel is used for the wire 70. To form an end puddle 25 having the center gold dot primary characteristic, the first metal of galvanized steel is used for the strip 35 and the second metal of steel is used for the wire 70. Further, the user may tilt the platform 40 to form an end puddle 25 having a secondary characteristic of a feathered perimeter as shown in FIG. 2.

The user feeds the wire 70 through the liner 52 of the MIG welder 50 and then through the contact tip 54 when using the MIG welder 50 to form a weld puddle 42. As the MIG welder 50 is used, the user forms a weld puddle 42 and continues to selectively fill the weld puddle 42 with the selected amount of melted strip 35 whereby the larger amount of the strip 35 used to fill the weld puddle 42 results in a large end puddle 25, while a smaller amount of the strip 35 used to fill the weld puddle 42 results in a small end puddle 25. Thus, both the height of the clamp 36 holding the strip 35 and the amount of strip 35 used controls whether an end puddle 25 is large or small. The user then allows the weld puddle 42 to drop onto the platform 40 thereby forming the end puddle 25. A hole 55 may be randomly formed in a random position in the end puddle as illustrated in FIG. 2. The hole 55 formation depends on how hard the weld puddle 42 drops onto the platform 40. The user must wait a period of time of about ten seconds to allow the end puddle 25 to cool before picking up the end puddle. The end puddle 25 should be handled with care via a handling tool (not shown). It is essential to keep the platform 40 smooth and clean in order to properly form an end puddle 25. The user may use a radius grinder (not shown) for maintaining platform 40 smoothness. The user may clean the platform 40 with light sandpaper (not shown). Using the present method 10 the user forms at least one end puddle 25, but may form a plurality of end puddles 25 as shown in FIG. 3 to form an art object 90.

The user forms an art object 90 by selecting at least one end puddle 25 via a first process, the first process selected from the group consisting of the step of randomly selecting each end puddle 25 and the step of non-randomly selecting each end puddle 25 according to size, a primary characteristic, and a secondary characteristic. After at least one end puddle 25 is cooled, the user selects the end puddle 25 having the selected size, primary characteristic, and secondary characteristic and affixes each end puddle 25 to a user-selected media 93. Each end puddle 25 is affixed to the selected media, by a second process selected from the group consisting of the step of welding each end puddle 25 to the selected media 93; the step of gluing each end puddle 25 to the selected media 93; and the step of wiring each end puddle 25 to the selected media 93. Art objects 90 are provided in various forms for various applications. Examples of art objects 90 which are formed utilizing the present method are wall hangings, flower arrangements, candelabras, free-form art objects, non-abstract art objects. An example of the non-random selection of end puddles 25 is the use of a plurality of small end puddles 25 having the blue sheen blue characteristic and feathered perimeter secondary characteristic affixed to a metal media 93 to form the feathers of a peacock sculpture, the end puddles 25 glued onto vertically positioned copper wiring 94 which simulate the appearance of feather shafts.

FIG. 4 provides a block diagram of the basic process by which an end puddle 25 is formed for making a metallic art object 90 according to the present method 10. The steps shown in FIG. 4 are to place a strip 35 of stainless steel in a range of one to two feet above the metal surface 40. Another step is to employ a MIG welder 50 to melt stainless wire 70 to create a puddle 42. Another step in the method shown in FIG.

4 is to continue filling the puddle 42 until the puddle 42 drops down to the surface 40. Yet another step in the method is to allow puddle drops 25 to cool for 10 seconds. Still another step in the process is to clean the metal surface, which is the platform 40, with light sandpaper (not shown).

For the purposes of the description of FIG. 4 herein, the term 'metal surface' is defined as the 'platform' 40 and the terms 'end puddle drop' and 'puddle drops' are defined as 'end puddle', including the plural forms thereof. The use of the term 'puddle' without an accompanying modifier of 'weld' as in 'weld puddle' 42 or the modifier 'end' as in 'end puddle' 25 shall be defined herein as a 'weld puddle' 42.

With respect to the above description then, it is to be realized that the optimum dimensional relationships for the parts of the method of making a metal art object, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Directional terms such as "front", "back", "in", "out", "downward", "upper", "lower", and the like may have been used in the description. These terms are applicable to the examples shown and described in conjunction with the drawings. These terms are merely used for the purpose of description in connection with the drawings and do not necessarily apply to the position in which the present invention may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method of making a metal art object comprising the steps of:
   utilizing a welding assembly comprising:
      a mounting assembly comprising:
         a base, wherein the base sits flat atop a working surface;
         a dowel vertically extending from the base;
         a vertically adjustable clamp engaging the dowel;
         a metallic strip of a selected first metal, the strip having a proximal end and a distal end and the proximal end removably affixed to the clamp in parallel position to the base, wherein the first metal is selected from the group consisting of stainless steel and galvanized steel;
         a smooth metal platform positioned below the strip;
         a MIG welder having a liner therethrough and a contact tip wherein a spool of wire of a selected second metal is fed through the liner and then through the contact tip;
         wherein the wire has a diameter and wherein the second metal is selected from the group consisting of stainless steel wire and steel wire;
         a gas tank containing a gas mixture of argon, carbon dioxide, and helium wherein the gas tank is selectively connected to the MIG welder via tubing;
   connecting the MIG welder to the gas tank;
   using the MIG welder utilizing 140 amps and 110 volts;
   vertically adjusting the clamp to a selected height above the platform, wherein the clamp is configured to retain the proximal end of the strip and to suspend the strip directly above the platform;
   selecting each of the first metal and the second metal;
   selecting an amount of the strip to melt;
   feeding the wire through the liner and then through the contact tip;
   activating the MIG welder and melting the first metal and the second metal together;
   forming a weld puddle disposed on the distal end of the strip upon the melting of the first metal and the second metal together;
   allowing the weld puddle to drop, wherein the weld puddle splatters onto the platform;
   forming an end puddle, wherein the end puddle is the splattered weld puddle disposed on the platform and transformed into a solid state atop the platform;
   waiting a period of time to allow the end puddle to cool before picking up the end puddle;
   forming at least one end puddle.

2. The method of making a metal art object of claim 1 wherein the selected height is adjustable from one of a position of about one foot above the platform and of about two feet above the platform;
   wherein upon the retention of the strip from the clamp adjusted to the position of about one foot above the platform and the dropping of the molten drops from the strip retained about one foot above the platform, the end puddle has a first diameter; and
   wherein upon the retention of the strip from the clamp adjusted to the position of about two feet above the platform and the dropping of the molten drops from the strip retained about two feet above the platform, the end puddle has a second diameter greater than the first diameter.

3. The method of making a metal art object of claim 1 further comprising the steps of
   affixing each end puddle a selected media selectively using one of a second process, the second process selected from the group consisting of the step of welding each end puddle to the selected media, the step of gluing each end puddle to the selected media, and the step of wiring each end puddle to the selected media.

4. The method of making a metal art object of claim 1 further comprising the steps of selecting the first metal of stainless steel for the strip and selecting the second metal of stainless steel for the wire; and
   forming the end puddle having a primary characteristic of a blue sheen upon melting the stainless steel first metal and the stainless steel second metal together.

5. The method of making a metal art object of claim 1 further comprising the steps of selecting the first metal of stainless steel for the strip and selecting the second metal of steel for the wire; and
   forming the end puddle having a primary characteristic of a gold sheen upon melting the stainless steel first metal and the steel second metal together.

6. The method of making a metal art object of claim 1 further comprising the steps of selecting the first metal of galvanized steel for the strip and selecting the second metal of steel for the wire; and
   forming the end puddle having a primary characteristic of a center gold dot upon melting the galvanized steel first metal and the steel second metal together.

7. The method of making a metal art object of claim 4 further comprising the steps of selectively tilting the platform; and forming an end puddle having a secondary characteristic of a feathered perimeter upon tilting the platform.

8. The method of making a metal art object of claim 5 further comprising the steps of selectively tilting the platform; and forming an end puddle having a secondary characteristic of a feathered perimeter upon tilting the platform.

9. The method of making a metal art object of claim 6 further comprising the steps of selectively tilting the platform; and forming an end puddle having a secondary characteristic of a feathered perimeter upon tilting the platform.

10. The method of making a metal art object of claim 1 further comprising the steps of maintaining platform smoothness; and cleaning the platform with light sandpaper.

\* \* \* \* \*